(12) United States Patent
Alarcon

(10) Patent No.: US 10,519,708 B2
(45) Date of Patent: Dec. 31, 2019

(54) POLYCERAMIC BARRIER

(71) Applicant: Miguel Alarcon, Miami, FL (US)

(72) Inventor: Miguel Alarcon, Miami, FL (US)

( * ) Notice: Subject to any disclaimer, the term of this patent is extended or adjusted under 35 U.S.C. 154(b) by 91 days.

(21) Appl. No.: 15/669,635

(22) Filed: Aug. 4, 2017

(65) Prior Publication Data

US 2018/0051503 A1 Feb. 22, 2018

Related U.S. Application Data

(60) Provisional application No. 62/377,788, filed on Aug. 22, 2016.

(51) Int. Cl.
*E05G 1/00* (2006.01)
*E05G 1/024* (2006.01)
*C08K 3/00* (2018.01)

(52) U.S. Cl.
CPC ............... *E05G 1/024* (2013.01); *C08K 3/00* (2013.01); *E05G 1/00* (2013.01); *E05G 1/005* (2013.01)

(58) Field of Classification Search
CPC ............ E05G 1/024; E05G 1/005; C08K 3/00
See application file for complete search history.

(56) References Cited

U.S. PATENT DOCUMENTS

| 4,334,958 A | * | 6/1982 | Baluha | D21F 1/483 |
| | | | | 162/352 |
| 9,480,843 B2 | * | 11/2016 | Monteiro | A61B 5/04001 |
| 2018/0051503 A1 | * | 2/2018 | Alarcon | E05G 1/024 |
| 2018/0298154 A1 | * | 10/2018 | Lundorf | C01B 32/156 |
| 2018/0340174 A1 | * | 11/2018 | Lundorf | B82Y 30/00 |

* cited by examiner

*Primary Examiner* — Rick K Chang
(74) *Attorney, Agent, or Firm* — Katten Muchin Rosenman LLP

(57) ABSTRACT

A method for making a physical access restriction compartment, such as a safe or a vault. The method includes assembling a wall structure of the compartment. The wall structure includes a plurality of channels. The method also entails mixing 80-90% polyethylene with 10-20% ceramic into a polyceramic amalgam prior to thermally processing the polyceramic amalgam at a predetermined temperature for a preset period of time. The processed polyceramic amalgam is shaped into a plurality of polyceramic rods, which are then inserted into the plurality of channels of the wall structure. The wall structure with the plurality of polyceramic rods is mounted into a housing. The predetermined temperature is within a range between 140-180 Deg C. and the preset period of time is between 2.5-3.5 hours.

8 Claims, 10 Drawing Sheets

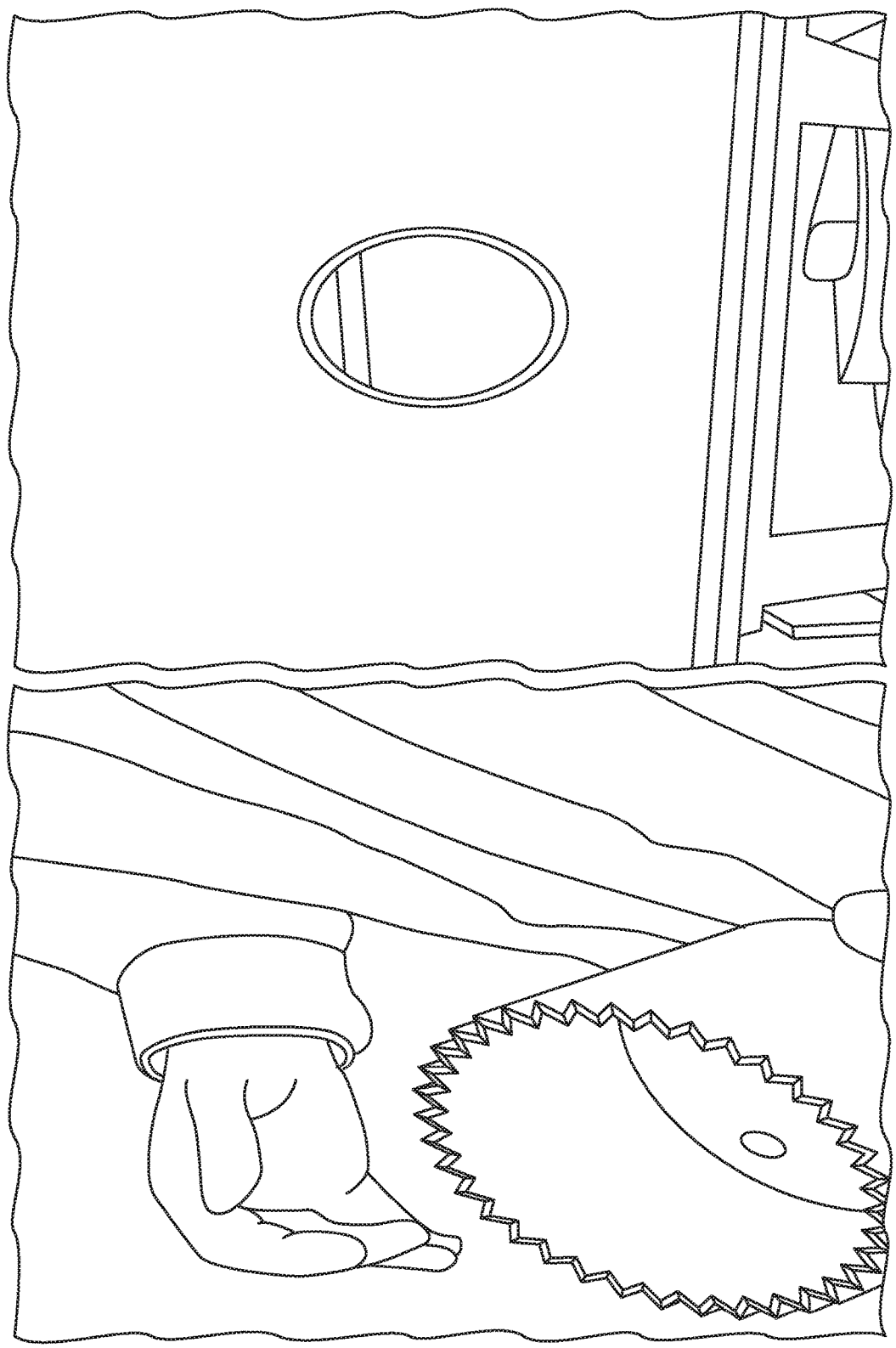

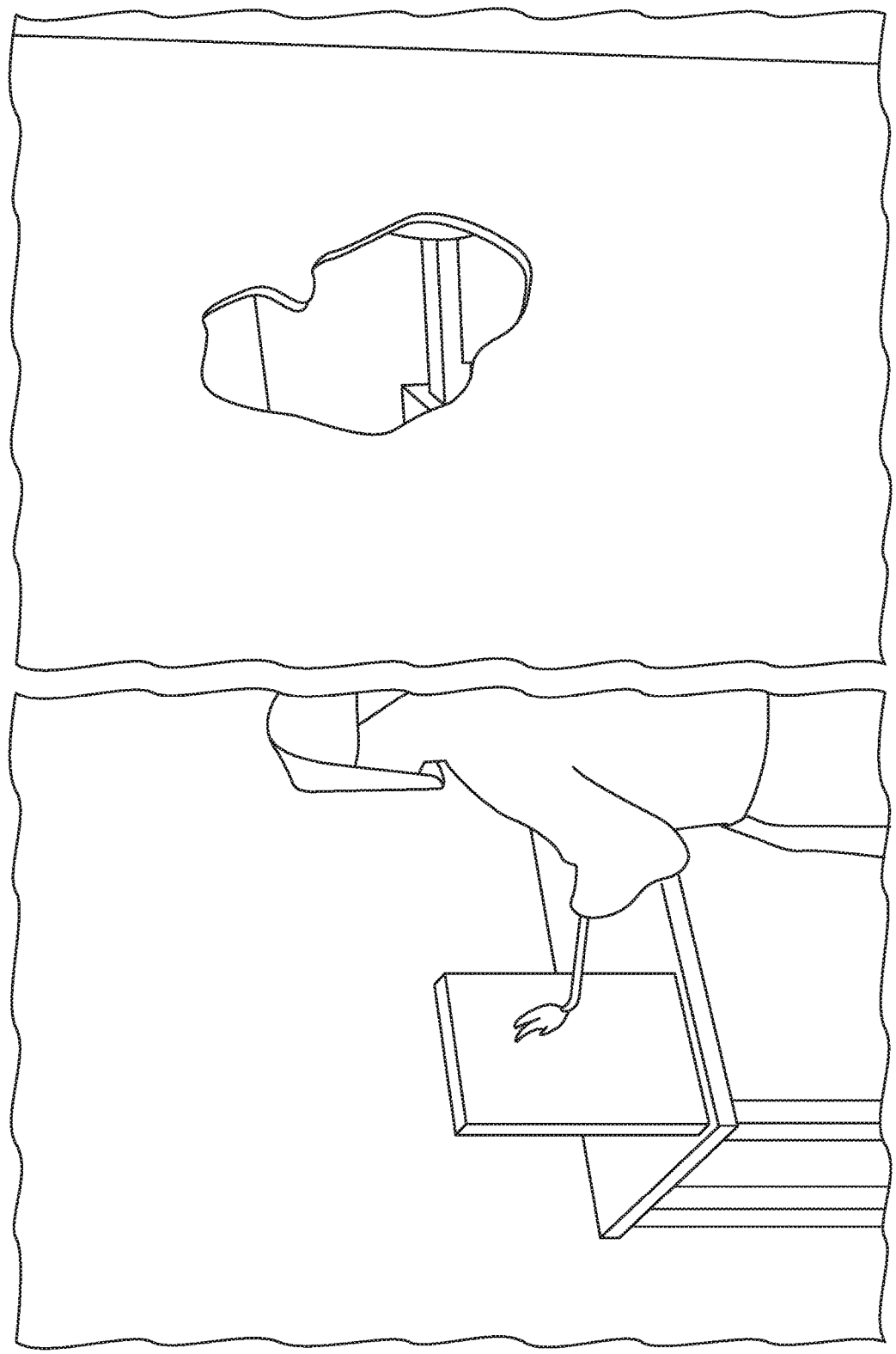

POLYCERAMIC BARRIER

This application claims priority to Provisional application No. 62/377,788, filed on Aug. 19, 2016.

TECHNICAL FIELD

The presently disclosed subject matter relates to providing security for personal property by limiting physical access to the property. In particular, the presently disclosed subject matter relates to containing and securing valuables inside a vault and preventing breach of the vault by means of destruction.

BACKGROUND

Conventional portable vault designs have traditionally been constrained by their key requirements: robust resistance to destruction and manageable weight. In the current technology, materials used in making safes have been selected to prioritize the main function of a safe, its capacity to maintain physical integrity. The material selection decisions have been made as a function of minimizing the cost of the manufacturing. Nonetheless, in order to ensure sufficient physical protection, a typical safe requires an abundance of the critical protection material. The quantity requirements have caused challenges in producing high-performance safes in a cost-effective manner.

One of the most prevalent techniques of the existing safe manufacturing technology has been combining steel with concrete. In some instances, steel rods have been embedded in concrete, and in other examples ribs of steel have been used as a supporting structure for pouring cement for it to solidify into concrete. However, the amount of a high-density material such as concrete has been proportional to the desired mechanical properties of the safe. As a result, concrete safes with have resilience have been excessively heavy, and this drawback has diminished their portability and their overall logistical manageability.

With the advancements in the polymer technologies, new components have been available to be used for a proper balance between mechanical properties and weight. Nonetheless, the conventional polymer materials, if simply used in combination with steel, have not shown satisfactory performance against thermal challenges such as torching, for example.

In light of the counteracting properties that are desirable in a safe all at the same time, such as mechanical resistance, thermal and ballistic resistance, manageable weight and low manufacturing cost, a novel material is required that achieves an optimal balance among these mutually opposed characteristics.

SUMMARY

The presently disclosed subject matter relates to a method of making a physical access restriction compartment, such as a safe or a vault. In one embodiment, the method comprises the steps of: assembling a wall structure of the compartment, wherein the wall structure includes a plurality of channels; mixing 80-90% polyethylene with 10-20% ceramic into a polyceramic amalgam; thermally processing the polyceramic amalgam at a predetermined temperature for a preset period of time; shaping the processed polyceramic amalgam into a plurality of polyceramic rods; inserting the plurality of polyceramic rods in the plurality of channels of the wall structure; and mounting the wall structure with the plurality of polyceramic rods into a housing. The predetermined temperature may be within a range between 140-180 Deg C. and the preset period of time may be between 2.5-3.5 hours.

The method may further include mixing 80-85% polyethylene with 15-20% ceramic into a polyceramic amalgam. The wall structure may include a plurality of ribs, and the plurality of ribs may be L shaped or S shaped. A material used for the plurality of ribs may be steel.

BRIEF DESCRIPTION OF THE DRAWINGS

FIG. 9 shows an example of mechanical testing of the polyceramic with a round saw.

FIG. 10 shows an example of thermal testing of the polyceramic by torching.

DETAILED DESCRIPTION

The presently disclosed subject matter provides a system for storing and protecting personal belongings in a secured compartment and a method of making the compartment. Specifically, certain examples of the present invention show methods of making a system that adequately prevents breach of the secured compartment, such as a vault or a portable safe. Some of the contemplated attacks on the physical integrity of the safe are drilling of the safe or any similar manner of mechanical destruction, torching of the safe or any other possible thermal breach, or a variety of ballistic methods of destruction to protect from.

The integrity and robustness of the safe may be achieved by the arrangements of the physical components of the safe, by selection of the material of each individual component, by defining the proportions of the components in an amalgamation, by thermal processing of either the individual components or of the amalgamation of some or all of the components, or by any combination or variation the identified steps.

Figure 1:
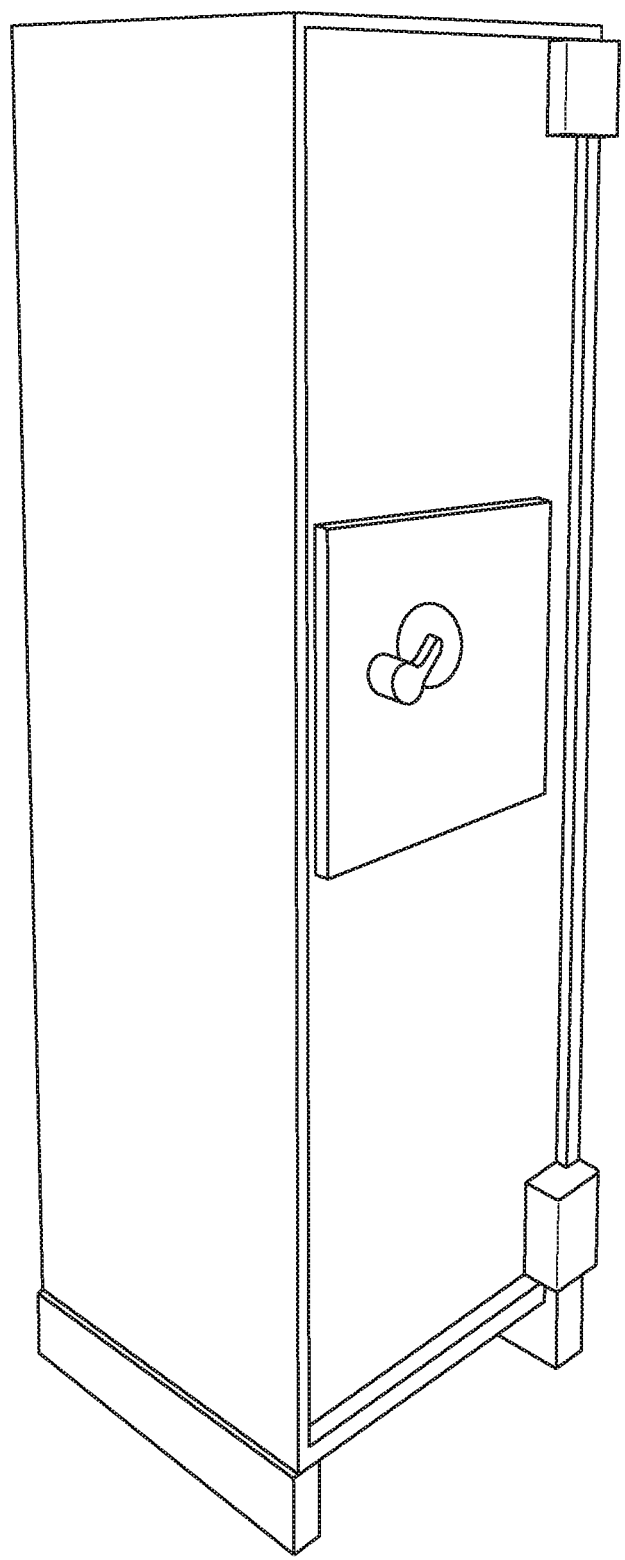
FIG. 1 shows an example of a finalized polyceramic safe.

FIG. 1 shows safe 5524 TL-30 which is one example of a final product manufactured by a safe manufacturing technique that will be described in detail. Safe 5524 TL-30 may be made of recyclable materials in its entirety, as labeled in FIG. 1.

Figure 2:
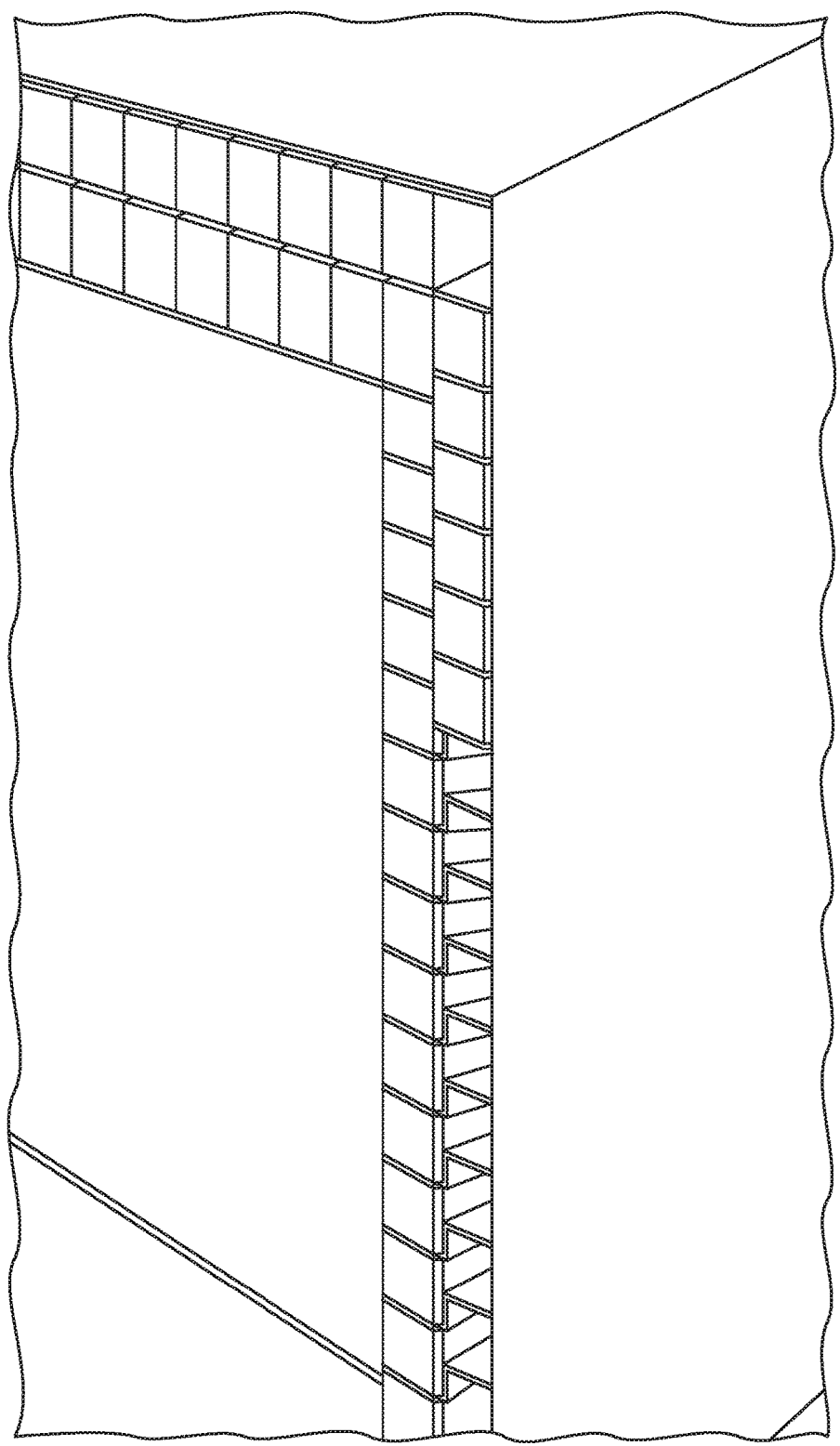
FIG. 2 shows an example of polyceramic rods inserted into a wall of a safe.

FIG. 2 illustrates an example of safe configuration removed from its outer housing. A box-shaped steel structure in FIG. 2 includes a plurality of channels disposed around its periphery. The channels may accommodate polyceramic rods, as will be discussed in detail.

The channels may be located along any or all of the sides of the steel structure, depending on the desired protection. The dimensions of the safe may vary based on the storage capacity of the safe as well as based on thickness of its walls.

The dimensions of the safe may be further determined as a function of the required sturdiness of the safe, in terms of mechanical, thermal or ballistic performance. A maximum weight of the safe may be an additional criterion in defining the characteristics of the safe walls.

Figure 3:
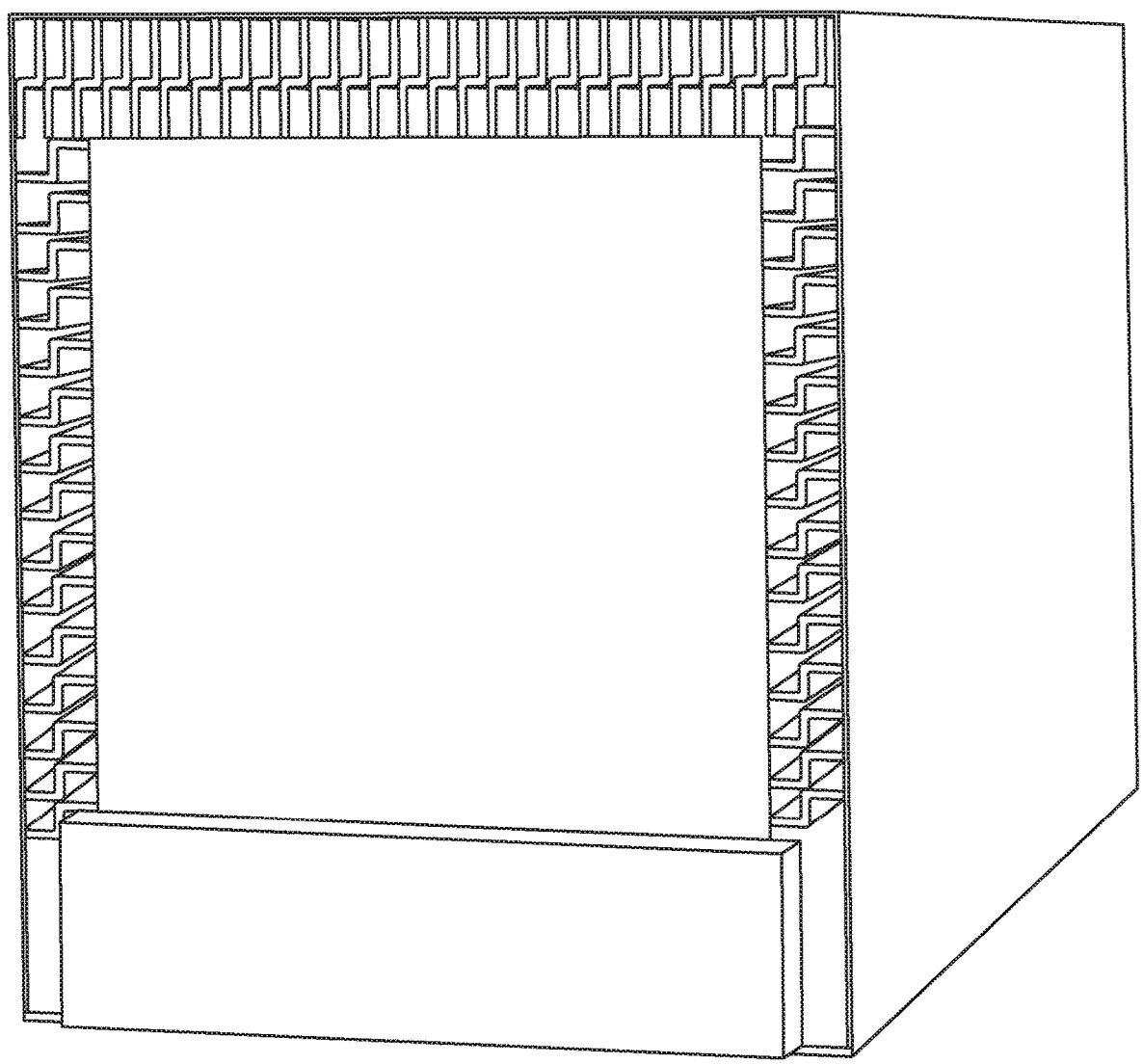
FIG. 3 shows an example of a hollow structure that supports polyceramic rods.
Figure 4:
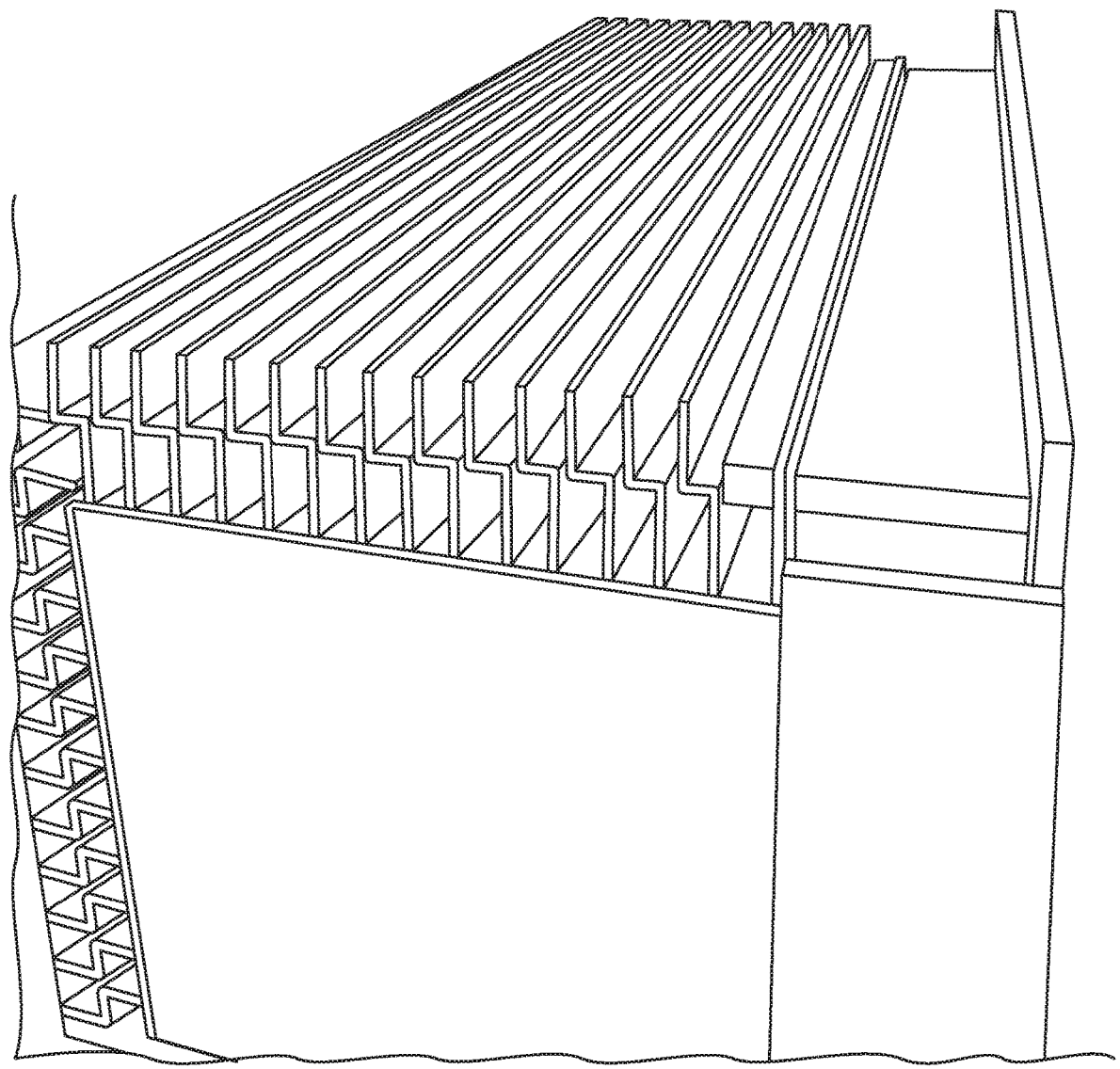
FIG. 4 shows an example of ribs that form the hollow structure of the wall.

FIG. 3 depicts a hollow structure of a safe with the channels prior to insertion of the polyceramic rods. The hollow structure may be formed by shaping and welding together a set of ribs shown in FIG. 4, by using molds, by 3-D printing or any other technique deemed suitable. The material used for the hollow structure may be steel or any other material considered appropriate.

Figure 5:
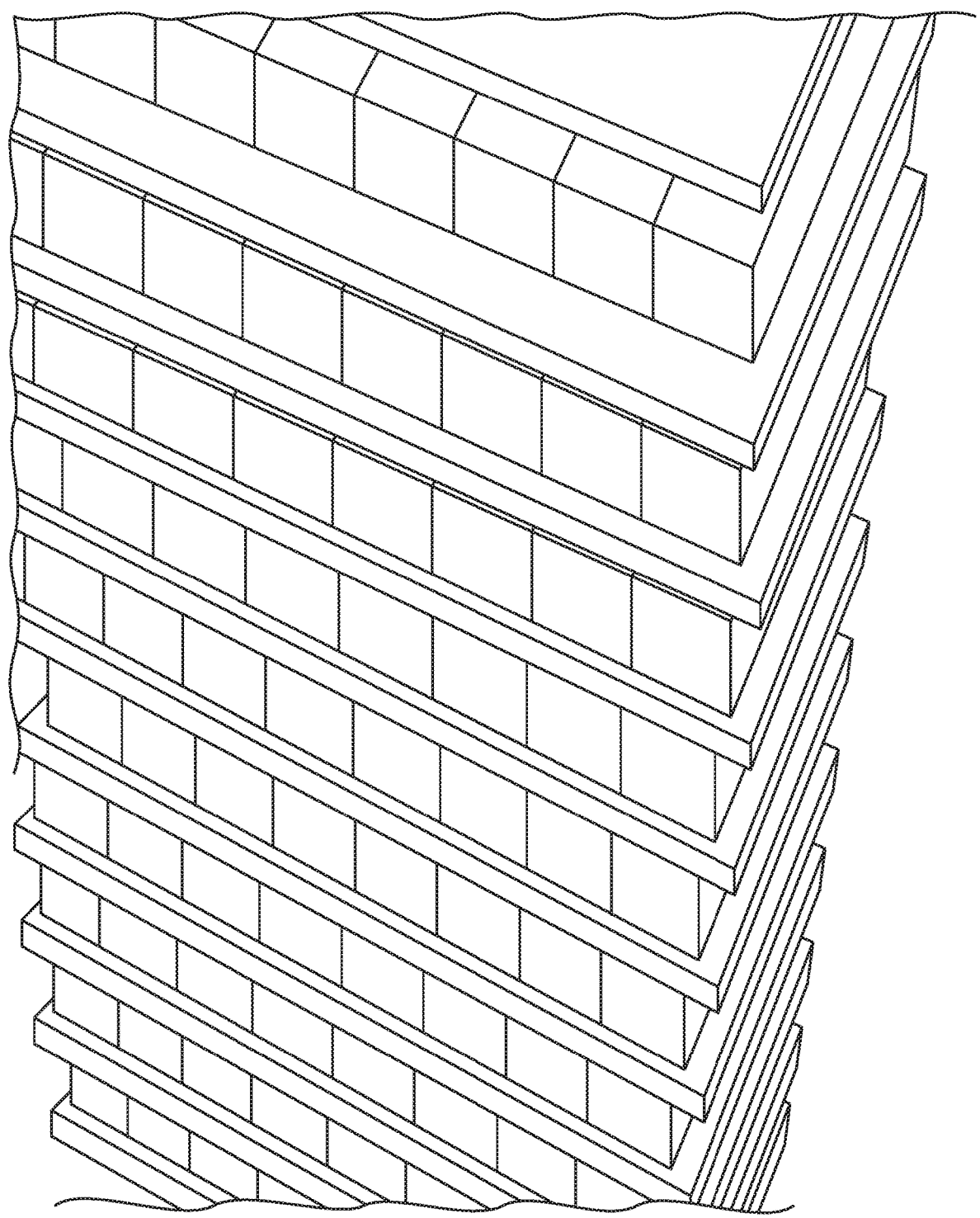
FIG. 5 shows an example of stacked polyceramic rods prior to insertion.
Figure 6:
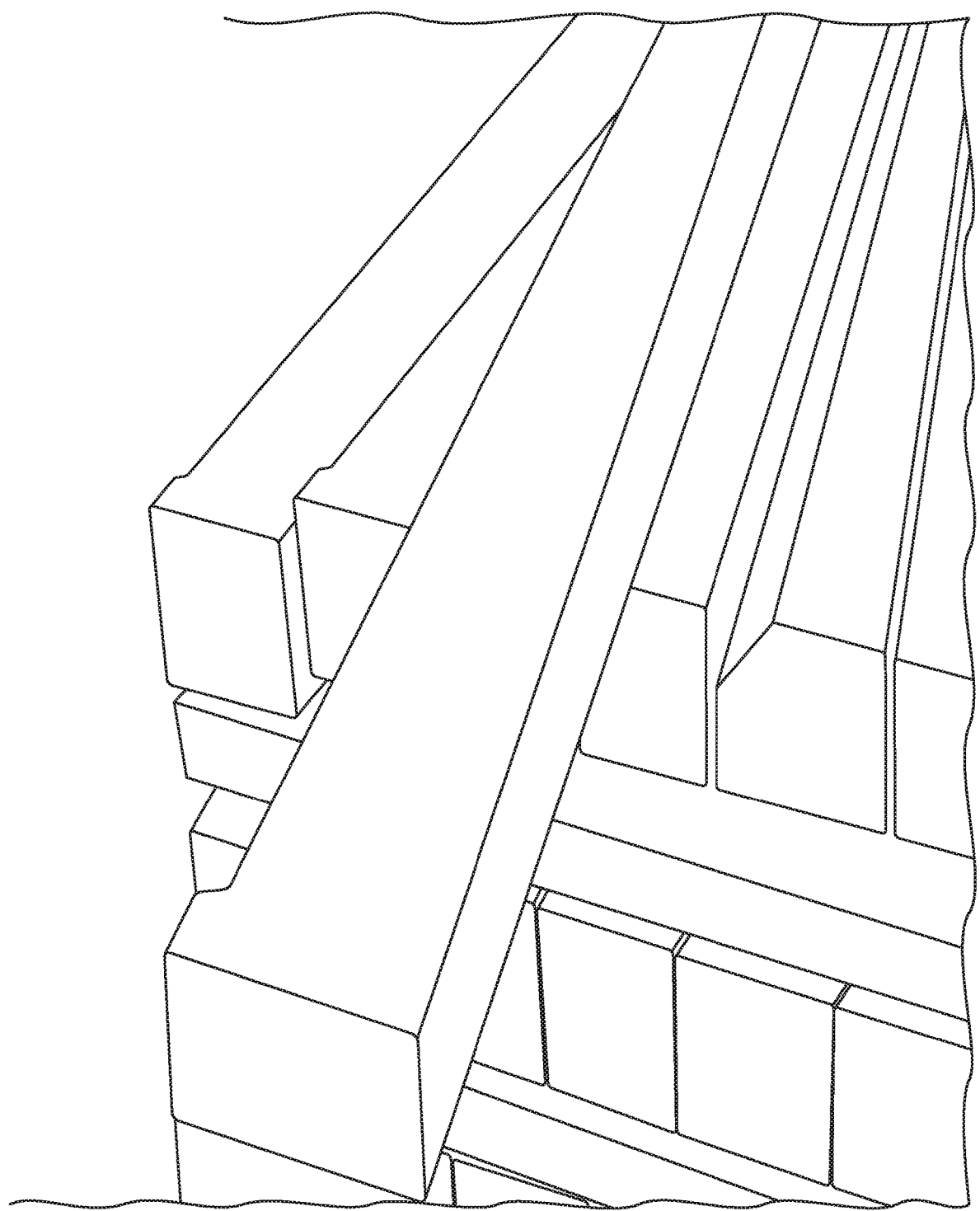
FIG. 6 shows an example of an individual polyceramic rod amalgam.

One example of multiple polyceramic rods used to populate the channels of the hollow structure is presented in FIG. 5. The shape and the quantity of the rods may correspond to the available slots in the hollow structure and may be determined based on the desired properties of the safe. The individual polyceramic rods are shown in FIG. 6. Traditionally, such rods have been made out of concrete, which has produced logistical issues due to a large amount of heavy concrete being required to accomplish even minimal standards of security and integrity of the safe. The evolution of shrewd techniques used to breach concrete safes or vaults has further diminished sufficiency of concrete as a material selected for the rods.

One example of the present invention applies a polychromic material instead. A low density polyethylene may be melted with a ceramic material in a ratio determined based on the level of protection. A small percentage of hot roll steel may be added to the polyceramic mixture. The mixture may include approximately 80-90% low density polyethylene, 10-20% high density ceramic medium and 0-5% hot roll steel. One example of the mixture contains 82.46% low density polyethylene. A specific ratio may be selected from the presented ranges based on the volume of the polyceramic, required robustness, weight restrictions, cost limitations, etc.

Once the percentages are established, a liquid polyethylene may be poured into molds and heated up for a predetermined time period at a desired temperature. In one example, the heating temperature is maintained for 2.5-3.5 hours within a temperature range of 140-180 Deg C. The polyethylene granules may be mixed with the high density ceramic media (e.g., one inch per side triangle shape) in a proportion selected from the ranges above and then poured into the molds.

Subsequent to the thermal processing of the polyethylene mixed with the high density ceramic media, the resulting polychromic rods may be shaped and slid into the channels of the hollow wall structure of the safe. Next, the segments of the wall structure may be sealed together, for example by welding, and the polyceramic steel structure may be housed in an external housing. The finalized safes may vary in sizes, and they weigh considerably less than their conventional equivalents in terms of performance. For example, model 6528 TL-30 weighs 1655 lbs. and model 5524 TL-30 weighs 1385 lbs.

Figure 7A:
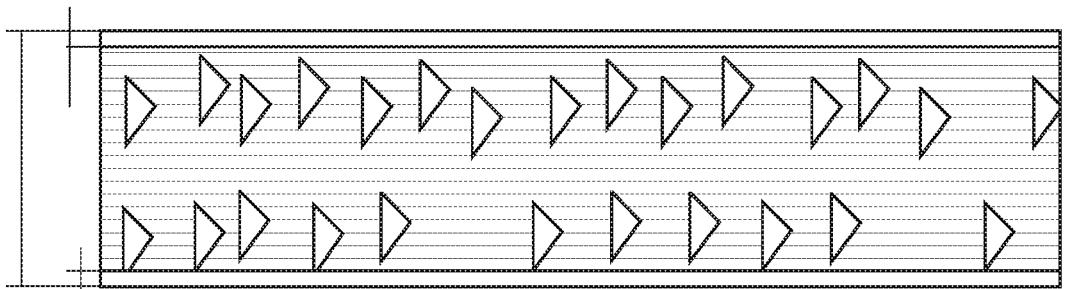
FIG. 7 shows examples of various frame configurations for the polyceramic core.

In terms of accommodating the polyceramic mixture, the configuration of the wall of the safe may vary based on the desired resilience, as depicted in FIG. 7. An example shown in FIG. 7(a) is a segment of a wall of the safe, where the polyceramic mixture is contained between an internal steel structure and a substantially parallel external steel structure. The protective performance of the safe may be adjusted by modifying the dimensions of the wall, such as the thickness of the internal and external metal layers, or the thickness of the polyceramic mixture, for example. In addition, mechanical, thermal or chemical robustness of the safe may be further adjusted by setting appropriate percentages of the polyethylene and the ceramic in the mixture within the wall.

Figure 7B:
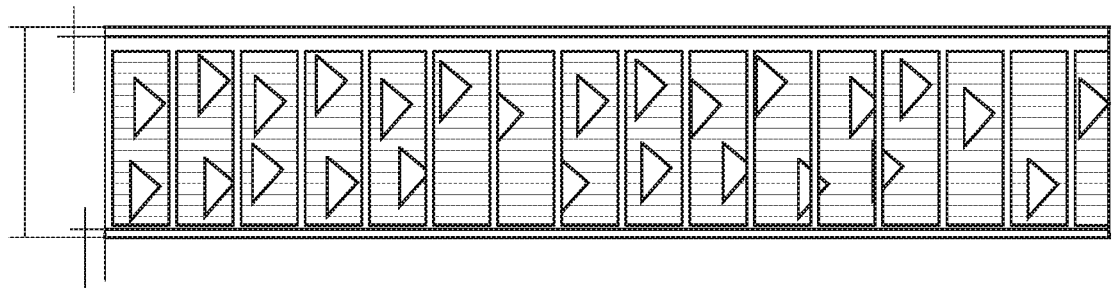
Figure 7C:
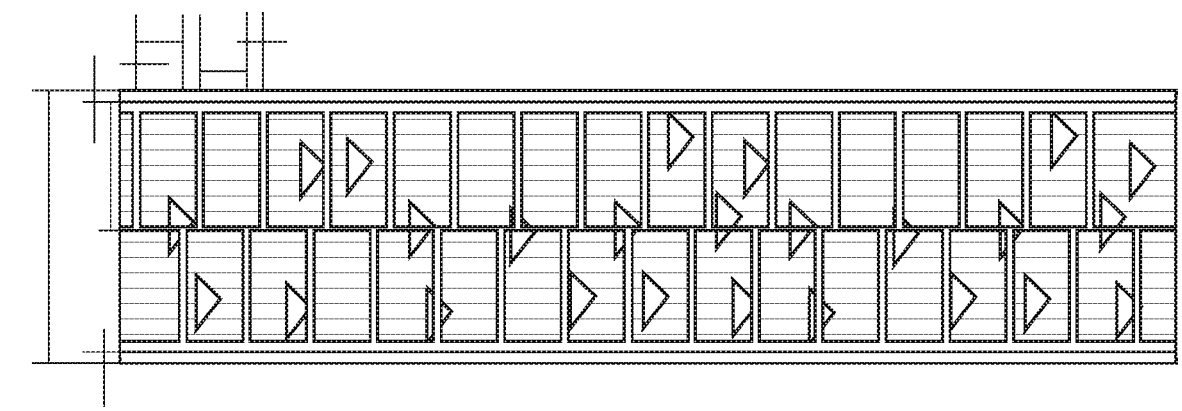

Moreover, the sturdiness of the safe may be additionally enhanced by adding "L shaped" steel ribs, or "S shaped" steel ribs, as illustrated respectively in FIGS. 7(b) and 7(c). The shape, thickness and spacing of the ribs may be further varied depending on the desired resistance properties of the safe.

Figure 8:
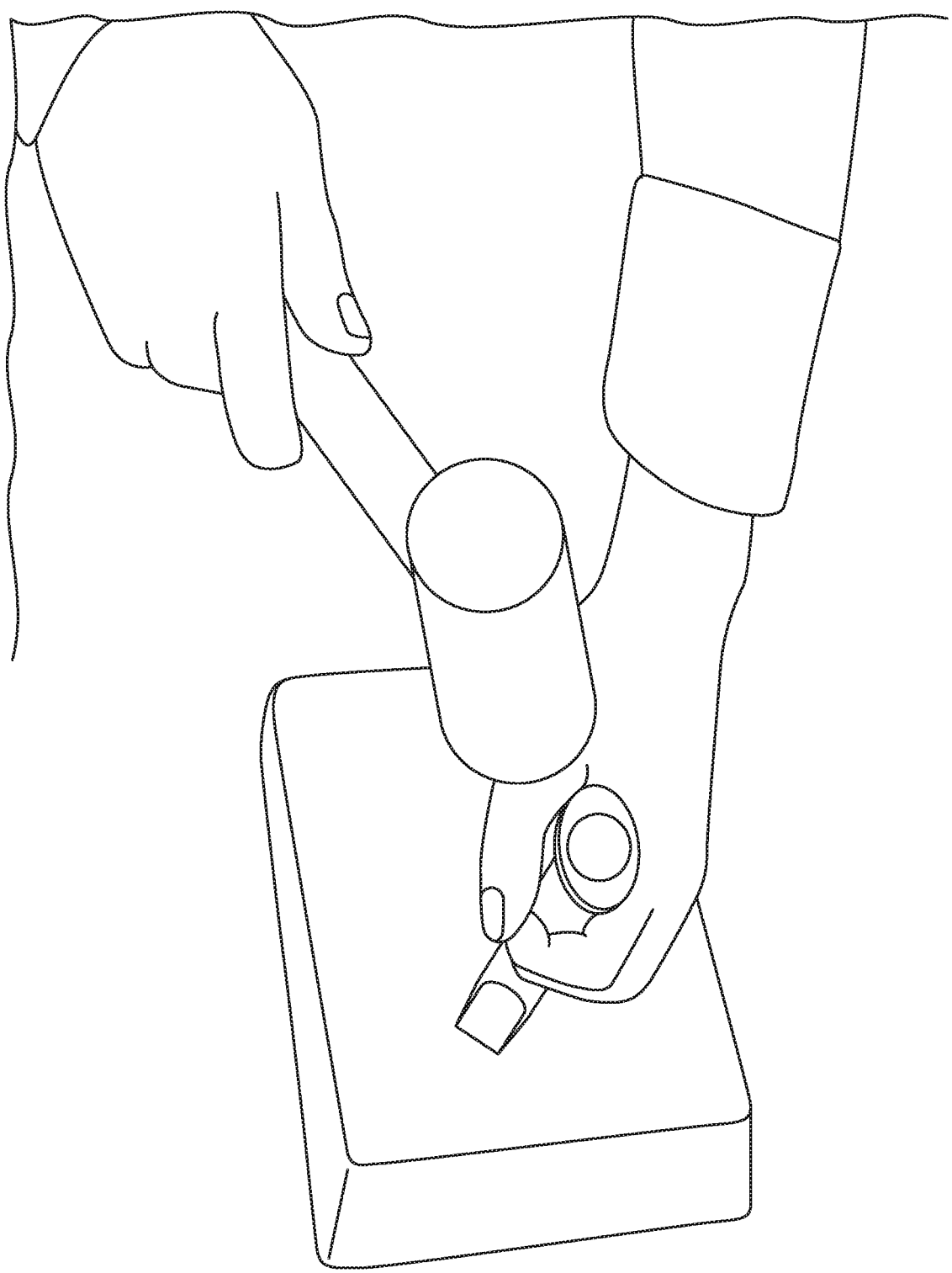
FIG. 8 shows an example of mechanical testing of the polyceramic by chiseling.

One version of the polyceramic steel structure has been exerted to multiple tests in order to demonstrate its protective capacity. FIG. 8 shows a mechanical integrity test performed by chiseling into one example of the polyceramic material. After approximately 20 minutes, a chisel had only penetrated about 1 inch of the processed polyceramic.

Next experimental breach attempt was performed by drilling into the polyceramic material by a round saw, as illustrated in FIG. 9(a). The polyceramic material wore down the cutting edge of one saw in less than one minute of cutting, and seven saw blades were used to penetrate less than 30% of the material, as shown in FIG. 9(b).

Subsequently, a torch test depicted in FIG. 10(a) was performed on the polyceramic structure. As shown in FIG. 10(b), after 12 minutes of torch cutting, only approximately 50% of the thickness of the wall of the vault was penetrated.

Lastly, a severe test was performed by Underwriters Laboratories Inc., and the tested structure has been approved for the certification UL-TL-30 and TL-30x6.

Although the various systems, functions, or components of the present invention may be described separately, in implementation, they do not necessarily exist as separate elements. The various functions and capabilities disclosed herein may be performed by separate units or be combined into a single unit. Further, the division of work between the functional units can vary. Furthermore, the functional distinctions that are described herein may be integrated in various ways.

The foregoing description and examples have been set forth merely to illustrate the invention and are not intended to be limiting. Each of the disclosed aspects and embodiments of the present invention may be considered individually or in combination with other aspects, embodiments, and variations of the invention. Modifications of the disclosed embodiments incorporating the spirit and substance of the invention may occur to persons skilled in the art and such modifications are within the scope of the present invention.

What is claimed is:

1. A method of making a physical access restriction compartment, comprising:
   assembling a wall structure of the compartment, wherein the wall structure includes a plurality of channels,
   mixing 80-90% polyethylene with 10-20% ceramic into a polyceramic amalgam,
   thermally processing the polyceramic amalgam at a predetermined temperature for a preset period of time,
   shaping the processed polyceramic amalgam into a plurality of polyceramic rods,
   inserting the plurality of polyceramic rods in the plurality of channels of the wall structure, and
   mounting the wall structure with the plurality of polyceramic rods into a housing.

2. The method of claim 1, wherein the predetermined temperature is within a range between 140-180 Deg C.

3. The method of claim 2, wherein the preset period of time is between 2.5-3.5 hours.

4. The method of claim 1, further comprising mixing 80-85% polyethylene with 15-20% ceramic into a polyceramic amalgam.

5. The method of claim 1, wherein the wall structure includes a plurality of ribs.

6. The method of claim 5, wherein the plurality of ribs is L shaped.

7. The method of claim 5, wherein the plurality of ribs is S shaped.

8. The method of claim 5, wherein a material used for the plurality of ribs is steel.

* * * * *